(12) United States Patent
Swaminathan

(10) Patent No.: US 8,760,198 B2
(45) Date of Patent: Jun. 24, 2014

(54) LOW VOLTAGE LINE DRIVER

(75) Inventor: Karthik Swaminathan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 29 days.

(21) Appl. No.: 13/338,122

(22) Filed: Dec. 27, 2011

(65) Prior Publication Data

US 2013/0162301 A1 Jun. 27, 2013

(51) Int. Cl.
*H02M 11/00* (2006.01)
*H03F 3/45* (2006.01)

(52) U.S. Cl.
USPC ........... 327/103; 327/108; 327/109; 327/552; 327/553

(58) Field of Classification Search
USPC ......................................... 327/103
See application file for complete search history.

(56) References Cited

U.S. PATENT DOCUMENTS

| | | | |
|---|---|---|---|
| 5,661,432 A * | 8/1997 | Chang et al. | 327/552 |
| 6,483,380 B1 * | 11/2002 | Molnar et al. | 327/552 |
| 6,703,865 B2 | 3/2004 | Chan | |
| 6,833,734 B2 | 12/2004 | Chan | |
| 7,019,552 B2 | 3/2006 | Wang et al. | |

OTHER PUBLICATIONS

Author Unknown, AM26C31 Quadruple Differential Line Driver, SLS103I—Texas Instruments, 11pp. Feb. 2002.
Author Unknown, DEI3182A, ARINC 429 Differential Line Driver, Device Engineering Incorporated, 10pp., Apr. 2005.
Walt Jung and Adolfo Garcia, Op Amps in Line-Driver and Receiver Circuits, Part 2. Audio Applications, Analog Dialog 27-1, 4pp., 1993.
Author Unknown, AR8032 10/100 MII/RMII interface Fast Ethernet Transceiver, Atheros Communications, 2pp., Dec. 2010.
Randy Stephens, Active Output Impedance for ADSL Line Drivers, High Performance Linear Products, Application Report SLOA100, 52pp., Nov. 2002.

* cited by examiner

*Primary Examiner* — John Poos
(74) *Attorney, Agent, or Firm* — Brinks Gilson & Lione

(57) ABSTRACT

A line driver includes a transconductance stage that senses a differential voltage present at differential output nodes. The transconductance stage replicates a fraction of the differential voltage and generates a differential output current corresponding to the replicated differential voltage. The differential output current flows through a current mirror stage that mirrors the differential output current to the differential output nodes. The line driver thereby decouples the transconductance stage from the differential output nodes. A lower line driver voltage supply (e.g., 1.8 V) may therefore supply the differential output nodes. A transconductance stage voltage supply separate from the line driver voltage supply may provide the supply voltage for the transconductance stage.

20 Claims, 7 Drawing Sheets

LOW VOLTAGE LINE DRIVER

BACKGROUND

1. Technical Field

This disclosure relates to line drivers for communication networks. In particular, this disclosure relates to a low voltage line driver for communication networks such as Ethernet networks.

2. Related Art

Line drivers typically transmit information across a network transmission line by generating a differential output voltage responsive to an input signal. Line drivers also provide a termination impedance, typically 100 ohms, for the network transmission line. The termination impedance is sometimes implemented either as an actual resistor (e.g., a physical 100 ohm resistor), or, more commonly, as an active termination stage in which a complex active circuit simulates a resistor. There is a need for a new active termination architecture that is suitable for smaller scale manufacturing processes (e.g., 28 nm processes) for circuits that use lower voltage supplies (e.g., 1.8 V).

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
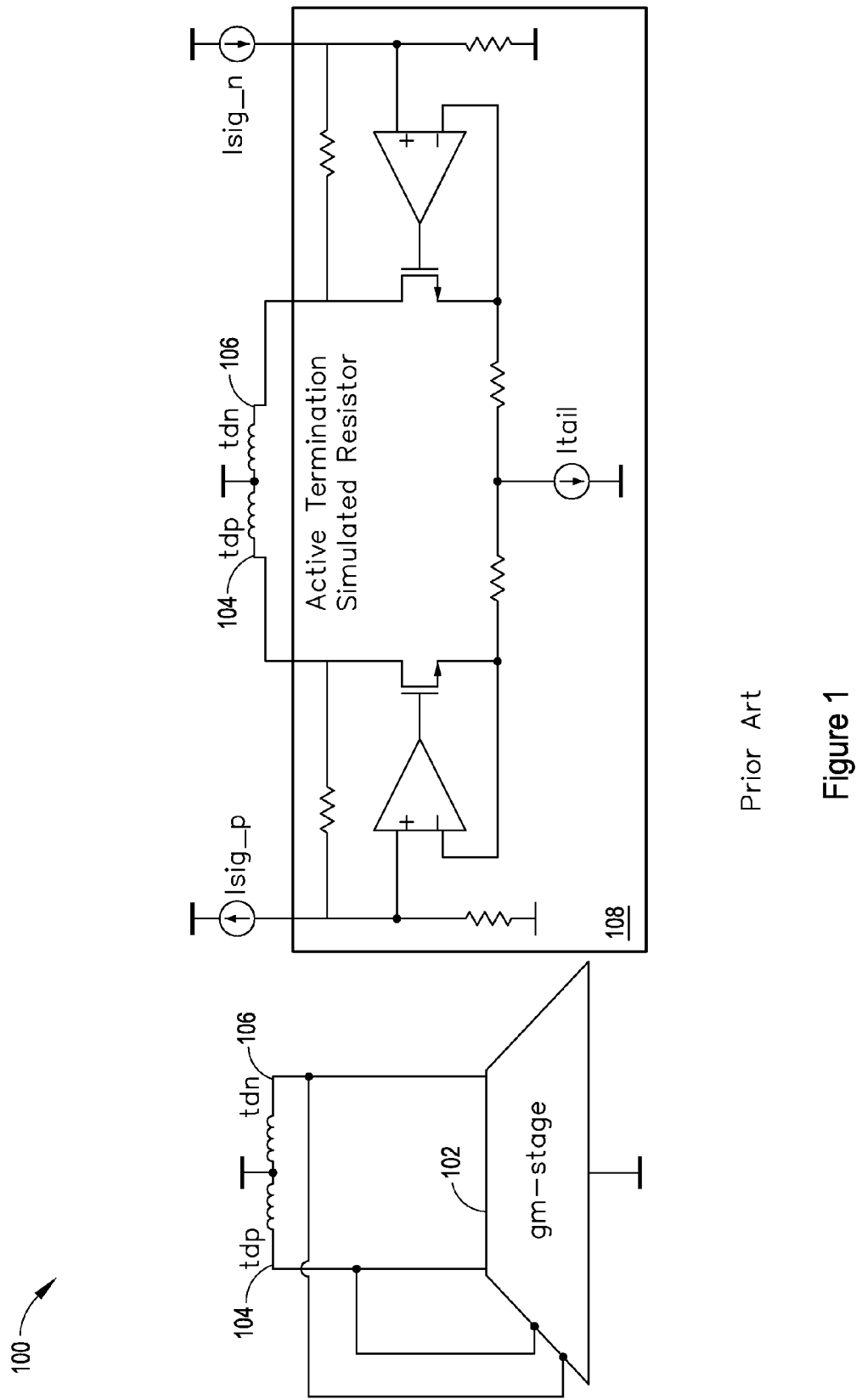
FIG. 1 shows a prior art line driver in which the active termination circuitry is stacked under the output nodes.

FIG. 1 shows a prior art line driver 100 in which a transconductance stage 102 is stacked under the differential output nodes tdp 104 and tdn 106. In the transconductance stage 102, an active termination circuit 108 may simulate a physical resistance of 100 ohms between the differential output nodes 104 and 106. To that end, the active termination circuit 108 may sense the voltage on the differential output nodes 104 and 106 and directly produce a current equal to the difference in voltage divided by 100 ohms through the differential output nodes 104 and 106.

The circuitry in the active termination circuit 108 is stacked below the differential output nodes 104 and 106. In other words, the circuitry in the active termination circuit 108 sits below (e.g., in series with) the differential output nodes 104 and 106, and produces differential current directly into the differential output nodes 104 and 106 through the transistors connected to the amplifier outputs. Accordingly, a somewhat higher line driver voltage supply (e.g., 2.5 V) is used to bias the differential output nodes 104 and 106 and to provide sufficient headroom for the active termination circuit 108 to function properly. For example, at 2.5 V, the voltages at the differential output nodes 104 and 106 may drop as low as 2.5 V−1.25V=1.25V, which is adequate voltage headroom for running the active circuitry stacked underneath the differential output nodes 104 and 106. However, reducing the line driver voltage supply to 1.8 volts reduces the minimum voltage to approximately 1.8V−1.25 V=550 mv, at which operational voltage it can be difficult or impossible to properly operate the active circuitry stacked underneath the differential output nodes 104 and 106.

Figure 2:
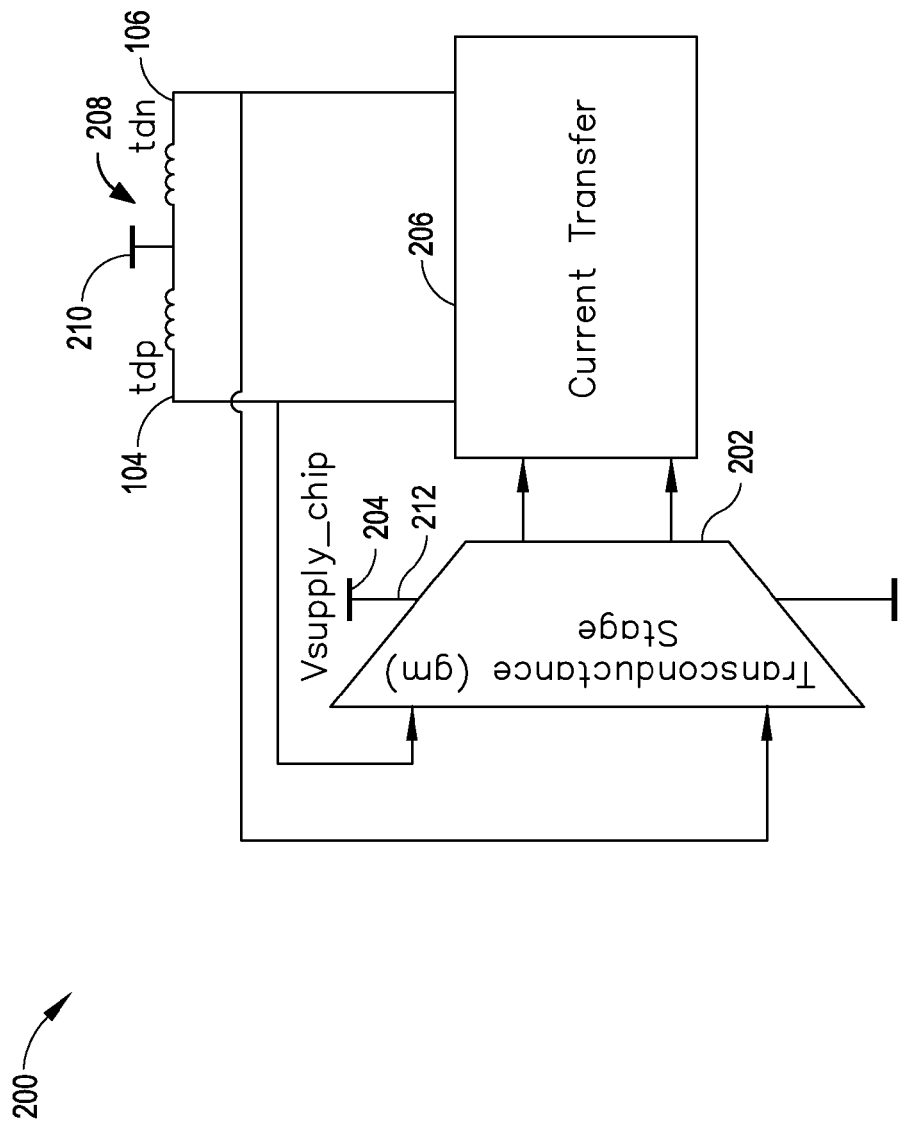
FIG. 2 shows a new line driver.

FIG. 2 shows a line driver 200 that may operate with a reduced line driver voltage supply, such as 1.8 V, for example. The line driver 200 separates or decouples the transconductance stage 202 from being stacked under the differential output nodes 104 and 106. The line driver 200 does not produce current directly into the differential output nodes 104 and 106. Instead, the transconductance stage 202 produces a local differential current, and the current transfer stage 206 (e.g., a current mirror) generates a corresponding differential current in the differential output nodes 104 and 106.

Furthermore, the transconductance stage 202 may be powered directly by the same or by a separate voltage source that supplies the line driver supply voltage to the differential output nodes 104 and 106. For example, the transconductance stage 202, including amplifiers and other circuit components (or any other circuitry configured to drive the differential output nodes 104, 106), may be powered directly from the chip voltage supply 204 (e.g., a 1.8 V supply). The chip voltage supply 204 is connected to the transconductance stage 202 through a transconductance stage voltage supply input 212.

Note that even if the chip voltage supply 204 also provides the line driver supply voltage (e.g., 1.8 V), the transconductance stage 202 is not stacked under the differential output nodes 104 and 106 and does not need to operate with the reduced voltage headroom caused by such a configuration. As a result, the transconductance stage 202 is decoupled from operation using the reduced voltage headroom and may correctly operate using the full range of the lower supply voltage (e.g., 1.8 V), where it would be difficult or impossible to operate using the reduced headroom range (e.g., 550 mV) that would result from being stacked under the differential output nodes 104 and 106. In other words, the transconductance stage 202 is no longer limited in its operational voltage range by the voltage ranges present on the differential output nodes 104 and 106.

The differential output nodes 104 and 106 may be output pins or pads on a physical line driver integrated circuit package that includes the line driver 200. The differential output nodes 104 and 106 are connected through an off-chip transformer 208. A tap 210 (e.g., a center tap) on the transformer provides a line driver voltage supply input for the supply voltage to the differential output nodes 104, 106. The line driver supply voltage may be 1.8 V, for example. The transformer 208 may be part of a transformer circuit that isolates the differential output nodes 104 and 106 from the physical differential output lines that interconnect different devices, systems, or networks. The transformer circuit reproduces the voltage differential across the differential output nodes 104 and 106 onto the actual differential output lines being driven.

The transconductance stage 202 senses the voltage difference Vtdp−Vtdn, and generates a current responsive to the voltage difference. For example, for a 100 ohm active termination, the transconductance stage 202 generates a current that, after the current transfer stage 206, is approximately (Vtdp−Vtdn)/100 through the differential output nodes 104 and 106. The current transfer stage 206 (e.g., a current mirror) replicates the current generated in the transconductance stage 202 to the differential output nodes 104 and 106. That is, the differential output current is not directly generated in the differential output nodes 104 and 106 by the transconductance stage 202. Little to no headroom is needed to transfer the differential output current to the differential output nodes 104 and 106. Furthermore, in some implementations, the transconductance stage 202 implements a relatively low current (less than the full desired output current through the differential output nodes 104 and 106), while the current transfer stage 206 implements a current gain to achieve that desired current through the differential output nodes 104 and 106. In other words, the current gain in the current transfer stage need not be 1:1, but may instead be set to achieve a desired power efficiency in the transconductance stage 202.

In one implementation, the transconductance stage 202 is an active termination stage. The active termination stage may employ operational amplifiers that control transistors based on voltage sensing resistor networks, with a feedback loop. The current transfer stage 206 replicates the current generated in the transconductance stage to the differential output nodes 104 and 106 in an amount needed to provide the desired termination impedance. The transconductance stage 202 may be implemented in other ways than as an active termination circuit, however, and the current transfer stage 206 may be implemented in other ways than as a current mirror.

Figure 3:
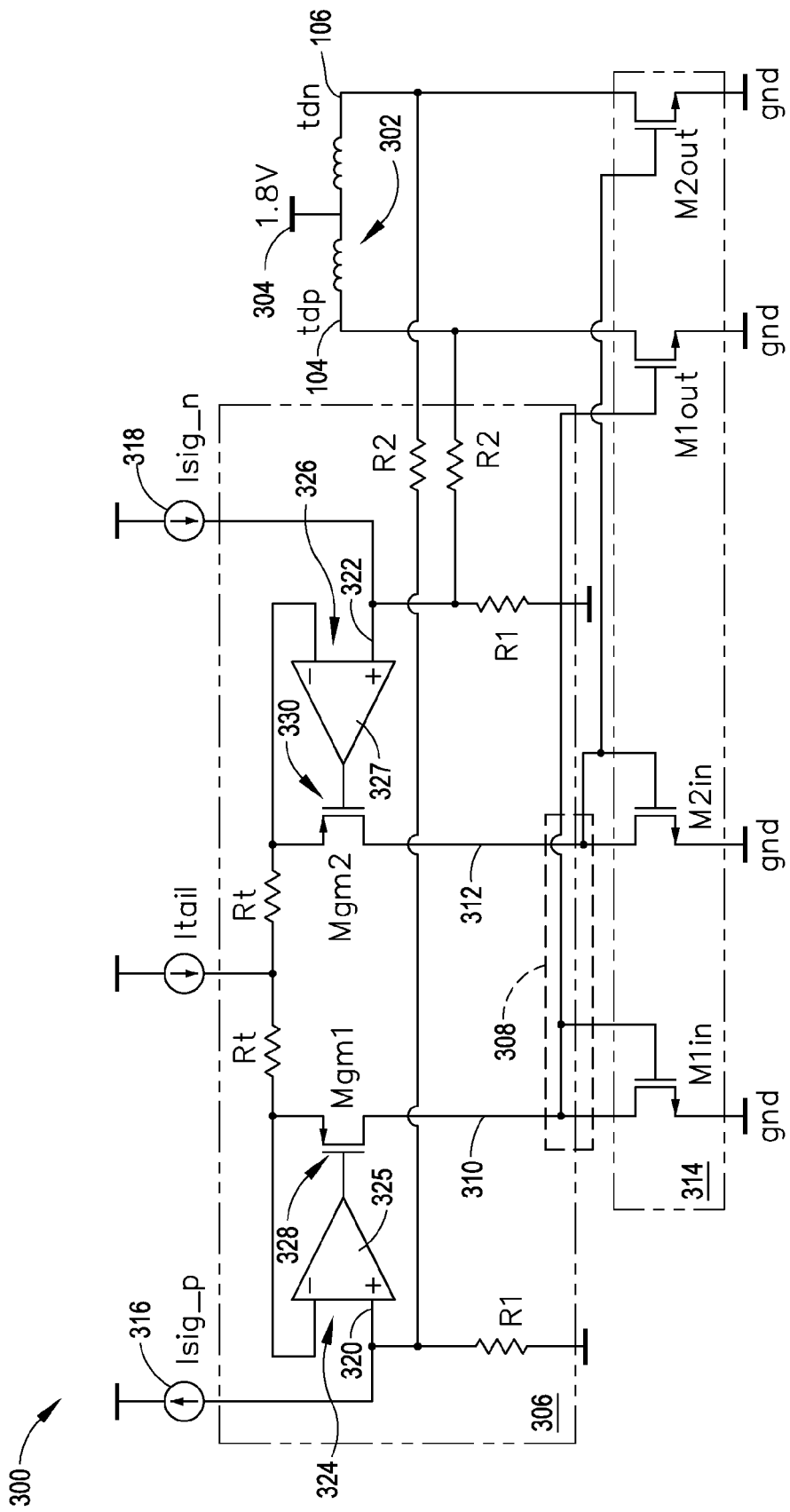
FIG. 3 shows a detailed circuit diagram of the new line driver.

FIG. 3 shows a detailed circuit diagram 300 of the line driver 200. The line driver includes differential output nodes 104 and 106. The differential output nodes 104 and 106 may connect through an off-chip transformer 302 that has a center tap 304. The center tap 304 provides a line driver voltage supply input to which is connected a line driver supply voltage (e.g., 1.8V).

A transconductance stage 306 is coupled to the differential output nodes 104 and 106. The transconductance stage 306 includes a transconductance stage voltage supply input (connected, for example, to the chip voltage supply 204) and that may be separate or the same as the line driver voltage supply input. The transconductance stage 306, in this example, is an active termination stage for the differential output nodes 104 and 106. The active termination stage senses a differential voltage on the differential output nodes 104 and 106 and produces a differential output current that (as explained in more detail below) will match to the desired impedance (e.g., 100 ohms) across the differential output nodes 104 and 106, when the differential output current is mirrored to the differential output nodes 104 and 106.

A transconductance output 308 of the active termination stage carries the differential output current corresponding to the differential voltage. In the example in FIG. 3, the differential output current flows through the drain connection 310 of the Mgm1 transistor and the drain connection 312 of the Mgm2 transistor. The differential output current is not provided directly into the differential output nodes 104 and 106.

Instead, a current mirror stage 314 is connected to the differential output nodes 104 and 106 and the transconductance output 308. The current mirror stage 314 generates (e.g., by current mirroring) a version of the differential output current to the differential output nodes 104 and 106. In the example shown in FIG. 3, the current mirror formed by M1in and M1out mirrors, to the differential output node tdp, the part of the differential output current flowing through the drain connection 310. Similarly, the current mirror formed by M2in and M2out mirrors, to the differential output node tdn, the part of the differential output current flowing through the drain connection 312.

The line driver 300 also includes differential input nodes 316 (Isig_p) and 318 (Isig_n). The differential input nodes 316 and 318 force current to generate a specified output voltage at the differential output nodes 104 and 106. In the example in FIG. 3, the differential input nodes 316 and 318 are coupled to the non-inverting operational amplifier nodes 320 and 322, respectively. The currents forced on the differential input nodes 316 and 318 change the voltage present at the non-inverting operation amplifier input nodes 320 and 322, and thus the output voltages at the differential output nodes 104 and 106. In particular, the transconductance stage 306 produces a corresponding change in current at the transconductance output 308, and the current mirror stage 314 generates a corresponding current in the differential output nodes 104 and 106, to maintain the desired active termination impedance.

The transconductance stage 306 includes operational amplifiers 325 and 327 with amplifier input stages 324 and 326. The operational amplifiers 325 and 327 replicate a fraction of the differential voltage present on the differential output nodes 104 and 106 at the source nodes of the Mgm1 and Mgm2 transistors included in the amplifier output stages 328 and 330. The amplifier output stages 328 and 330 generate the differential output current in the transconductance output 308. To that end, the transconductance stage 306 senses the differential voltage present on the differential output nodes 104 and 106 using the voltage sensing networks coupled to the non-inverting inputs of the operational amplifiers. The voltage sensing networks form a negative feedback loop for each operational amplifier.

The voltage sensing networks are implemented as voltage dividers formed from R1 and R2. The values of R1 and R2 may vary widely. In one implementation, the value of R1 is approximately 1K ohms and the value of R2 is approximately 10K ohms. The transconductance stage 306 presents a scaled version (as set by R1 and R2) of the differential voltage present at the differential output nodes 104 and 106 across the tail resistors Rt. The tail resistors Rt divide the tail current Itail to form the differential output current flowing through the drain connection 310 of the Mgm1 transistor and the drain connection 312 of the Mgm2 transistor.

The tail resistors Rt may vary in resistance according to the desired impedance that the transconductance stage 306 presents. In one implementation, the tail resistors Rt are approximately 5 ohms or less. However, the resistance of the tail resistors Rt can be adjusted for ease of fabrication or manufacturing by, for example, changing the gain in the current mirror stage 314.

The component values and impedance, Z, presented by the line driver 300 are related by:

$$Z = \frac{(R1 + R2)}{Rt + kR1} Rt$$

where k is the mirroring ratio (e.g., the gain in the current mirror stage 314) between M1in, M2in, M1out, and M2out (e.g., between 1:4 and 1:10).

In the line driver 300, a differential voltage on the differential output nodes 104 and 106 is divided by resistors R1 and R2 and coupled to the non-inverting inputs of the operational amplifiers. The negative feedback of the operational amplifiers, along with the transistors Mgm1 and Mgm2 replicate a scaled version of the differential voltage across the tail resistors Rt. The scaled version of the differential voltage produces a differential current local to the transconductance stage 306. The current mirror 314 then mirrors the differential current, using the transistor pairs M1in and M1out, M2in and M2out, to the differential output nodes 104 and 106, to maintain the desired termination impedance.

Figure 4:
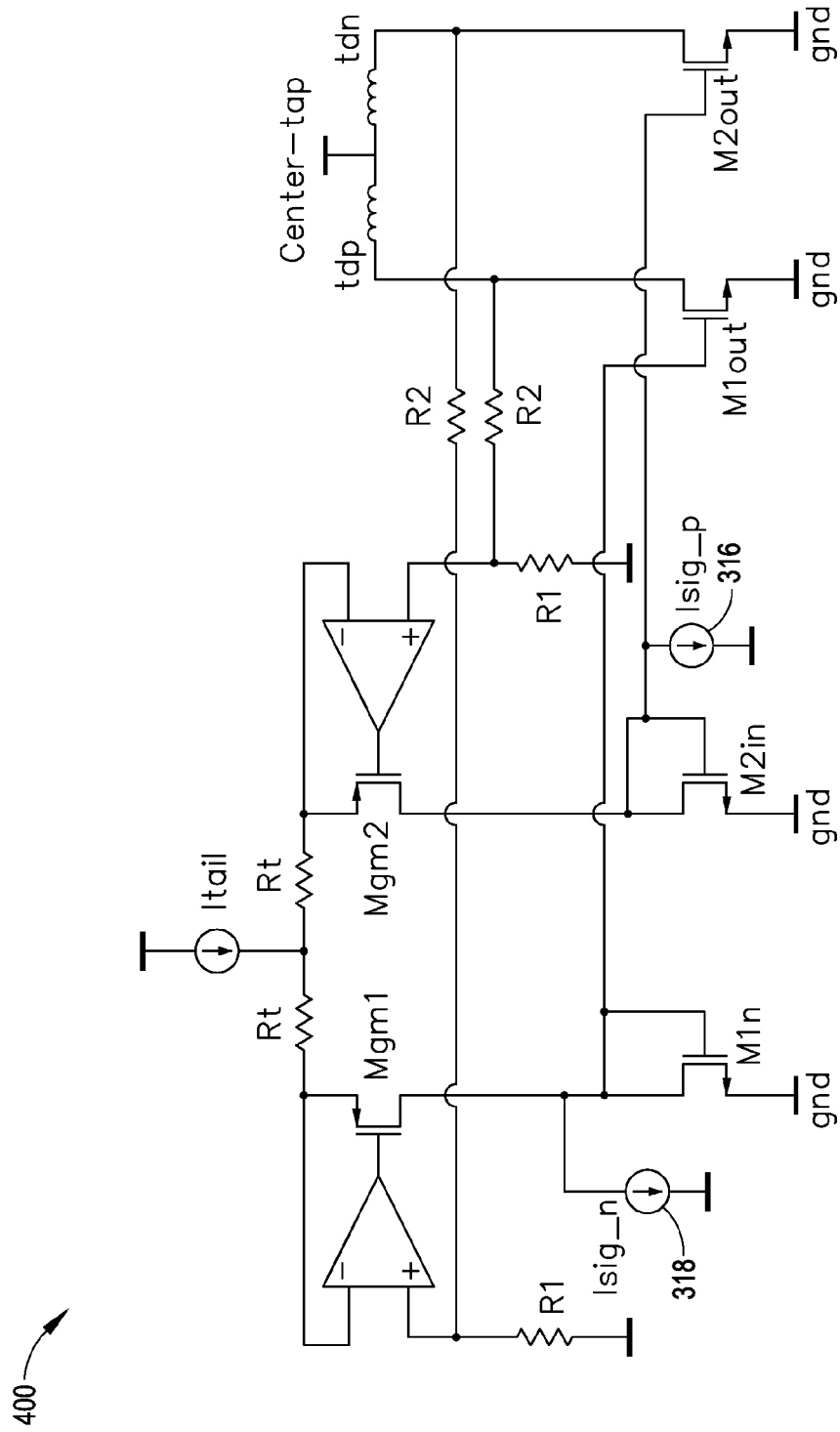
FIG. 4 shows an alternative implementation of a line driver.

FIG. 4 shows an alternative example of a line driver 400. Instead of supplying the signal current at the non-inverting inputs of the operational amplifiers, in the line driver 400, the signal current Isig_n 318 and Isig_p 316 is supplied or removed at the mirroring nodes of the M1in and M2in transistors. In particular, in the example in FIG. 4, the signal current is added or removed at the base connection of the M1in and M2in transistors, which are configured as diodes.

Figure 5:
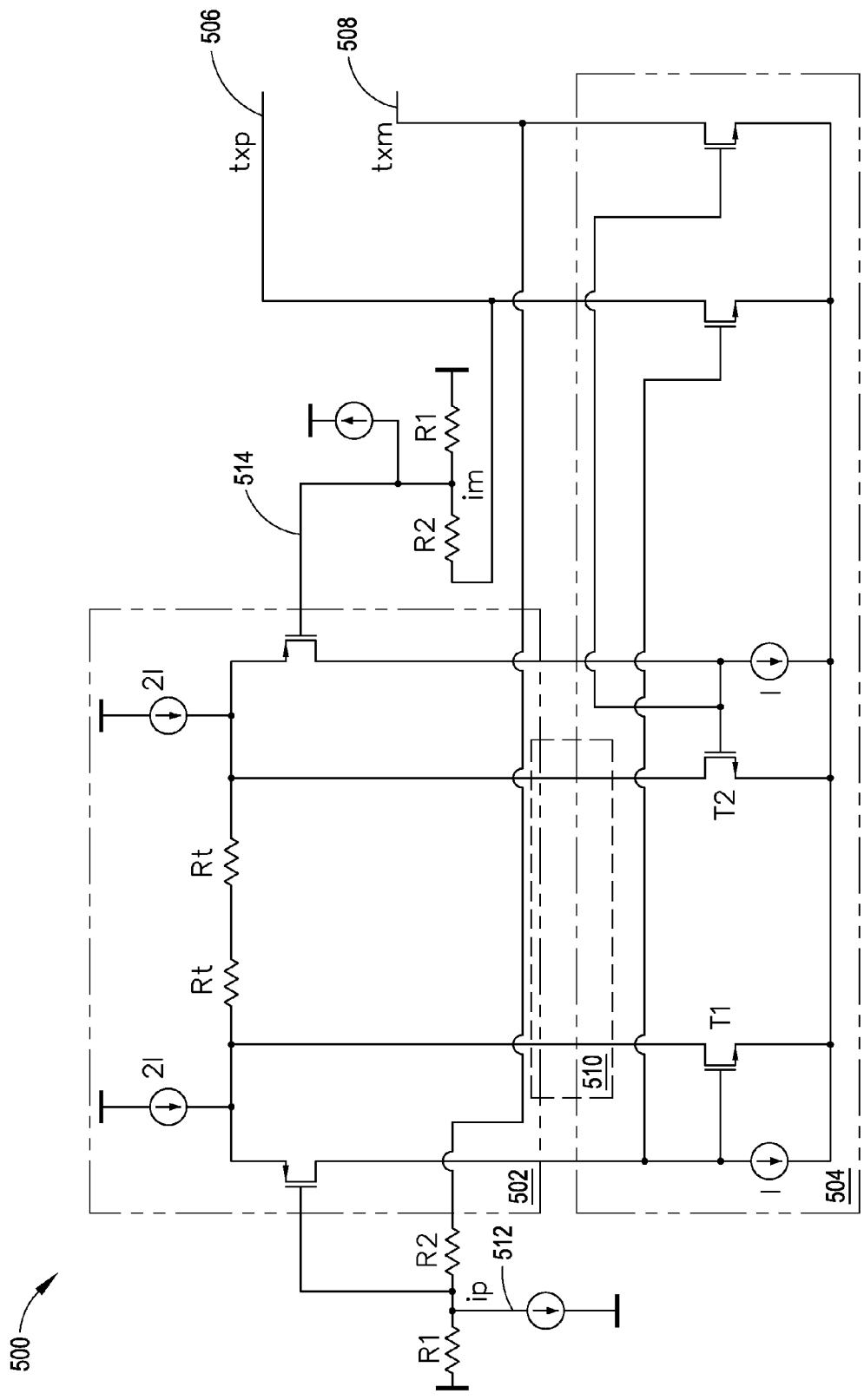
FIG. 5 shows an alternative implementation of a line driver.

FIG. 5 shows another alternative implementation of a line driver 500, and in particular a line driver with a different transconductance stage than the one described above. Similar to the designs explained above, in the line driver 500 a transconductance stage 502 feeds a current mirror 504. The differential output nodes txp 506 and txm 508 are not stacked above the transconductance stage 502. Instead, the transconductance stage 502 generates a differential current appropriate for providing the desired output impedance across the differential output nodes 506 and 508. The differential output current flows through the transconductance output 510 (e.g., the drain connections of the diode connected transistors T1 and T2). The current mirror 504 then produces a differential current in the differential output nodes 506 and 508 to achieve the desired termination impedance. A differential input current is forced on the differential input nodes 512 (ip) and 514 (im) to generate a desired differential output at the differential output nodes 506 and 508.

Figure 6:
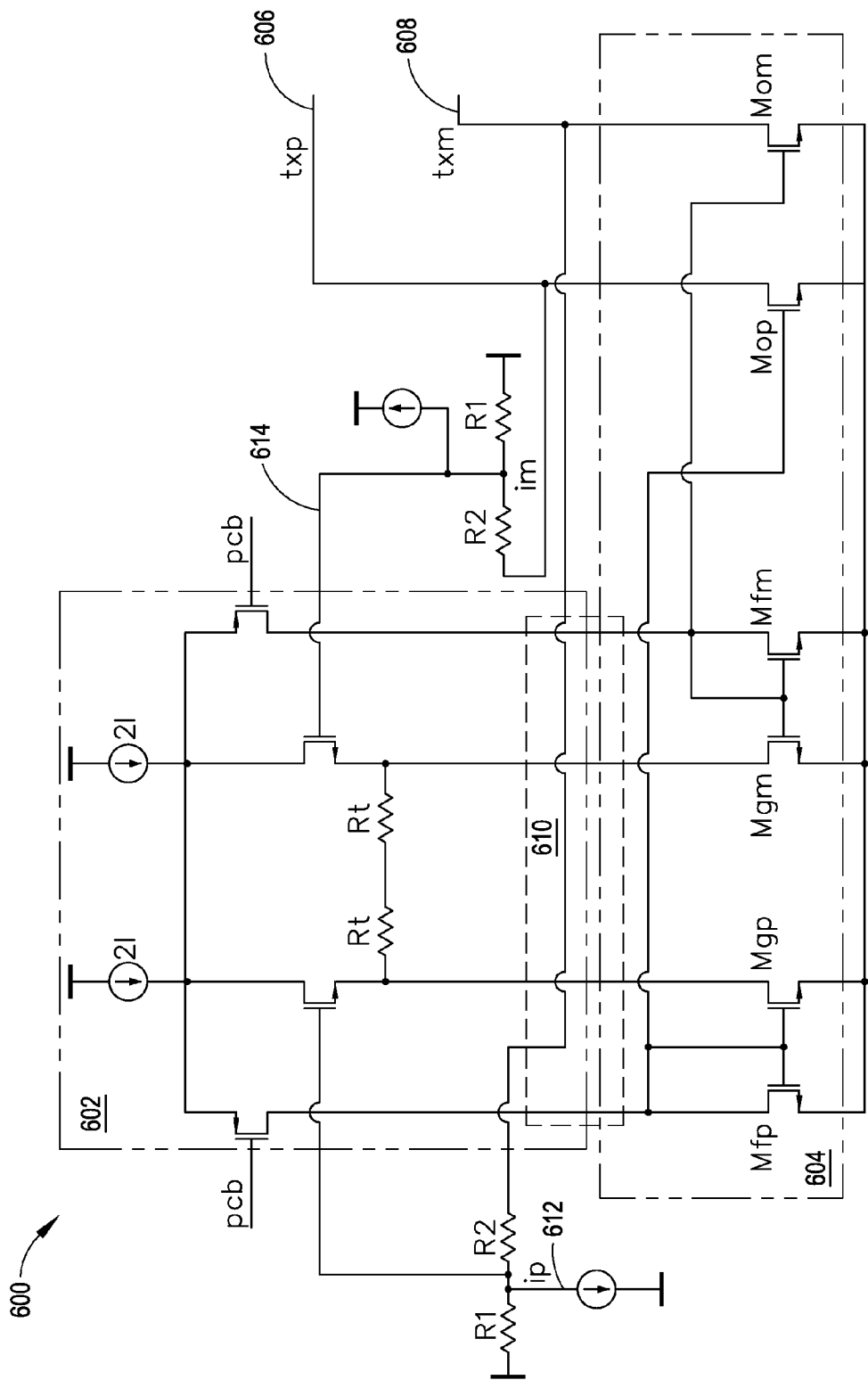
FIG. 6 shows an alternative implementation of a line driver.

FIG. 6 shows another alternative implementation of a line driver 600, and in particular a line driver with a different transconductance stage than the ones described above. Similar to the designs explained above, in the line driver 600 a transconductance stage 602 feeds a current mirror 604. The differential output nodes txp 606 and txm 608 are not stacked above the transconductance stage 602. Instead, the transconductance stage 602 generates a differential current appropriate for providing the desired output impedance across the differential output nodes 606 and 608. The differential output current flows through the transconductance output 610 (e.g., the drain connections of the diode connected transistors T1 and T2). The current mirror 604 then produces a differential current in the differential output nodes 606 and 608 to achieve the desired termination impedance. A differential input current is forced on the differential input nodes 612 (ip) and 614 (im) to generate a desired differential output at the differential output nodes 606 and 608.

Figure 7:
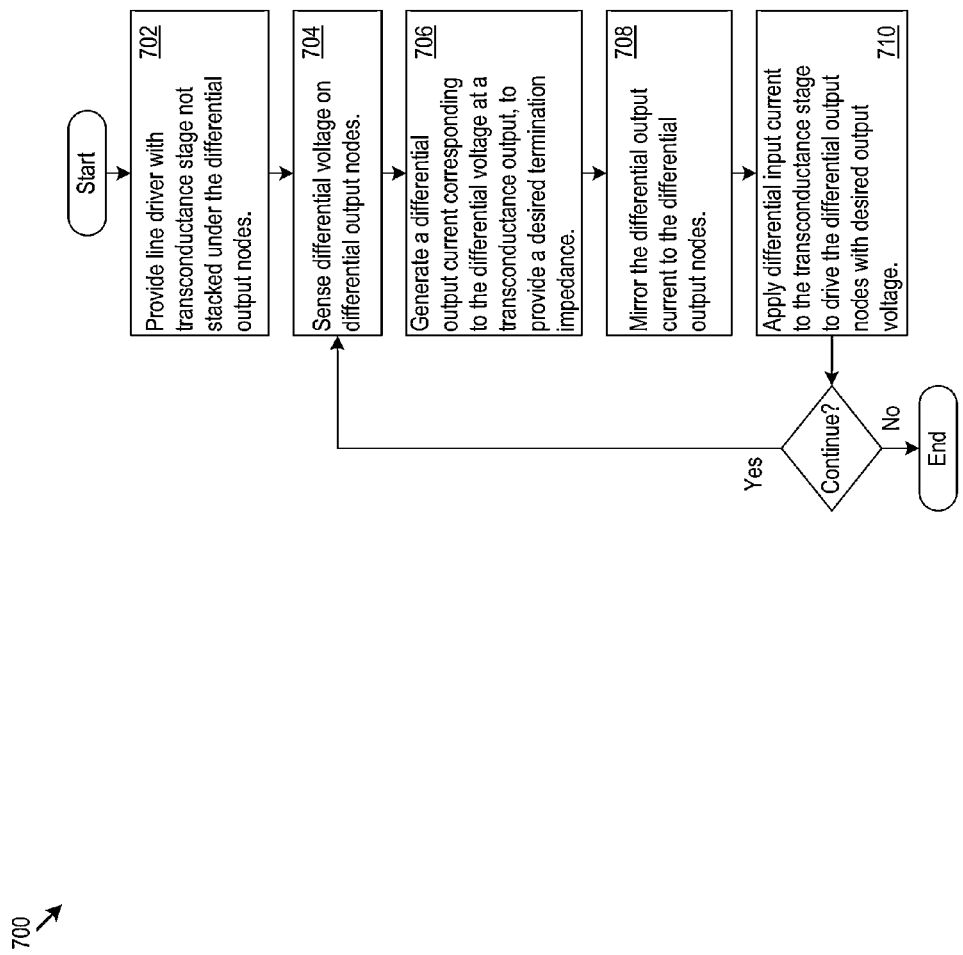
FIG. 7 shows a flow diagram of a technique to transmit data over communication lines.

FIG. 7 shows a method 700 for driving a communication line. A line driver is provided in which the transconductance stage is not stacked under the differential output nodes (702). The transconductance stage senses a differential voltage present on differential output nodes (704). The transconductance stage generates a differential output current corresponding to the differential voltage on the differential output nodes at a transconductance output (706). The differential output current implements a desired output impedance (e.g., 100 ohms) across the differential output nodes. The transconductance stage may implement an active termination (e.g., to give the appearance of the desired output impedance) of the differential output nodes.

A current mirror stage connected to the transconductance output receives the differential output current. The current mirror stage mirrors the differential output current to the differential output nodes (708). To drive the differential output nodes to desired output voltages for transmitting data, differential inputs may force differential current to the transconductance stage (710). As examples, the differential current may be forced at the non-inverting inputs of the operational amplifiers 325 and 327, or at the diode connected transistors M1in and M2in, as shown in FIGS. 3 and 4. This operation continues for as long as desired.

The new line drivers described above substantially decouple the transconductance stages from the differential output nodes, other than sensing the differential voltage across the differential output nodes, and mirroring a differential current (generated in the transconductance stage) back to the differential output nodes. As compared with line drivers using active termination circuits with a 2.5V supply, the present line drivers permit lowering the voltage supply (e.g., the center tap voltage) to 1.8V. The reduced voltage supply results in a system power reduction by as much as 28% or more.

Furthermore, a 1.8V supply is typically available in 28 nm products, and using the available 1.8V supply eliminates the requirement to generate (e.g., with additional circuitry) a separate 2.5V supply. Furthermore, the 1.8V supply is compatible with the voltage tolerances of thick oxide transistors used in the 28 nm process, which means that special transistor designs (or other circuit overhead to avoid overvoltage situations) are not needed as they would be if a 2.5V supply was used for the line driver.

What is claimed is:

1. A line driver comprising:
    differential output nodes;
    a driving circuit coupled with the differential output nodes and configured to provide a driving output, the driving circuit connected to the differential output nodes without being stacked below the differential output nodes; and
    a current mirror stage connected between the differential output nodes and the driving circuit, the current mirror stage configured to mirror the driving output to the differential output nodes.

2. The line driver of claim 1, where:
    the differential output nodes are configured to be connected to a first voltage supply; and
    the driving circuit is configured to be connected to a second voltage supply separate from the first voltage supply.

3. The line driver of claim 1, where the driving circuit comprises:
    a transconductance stage comprising:
        an active termination stage that is operative to sense a differential voltage on the differential output nodes and generate a differential output current corresponding to the differential voltage; and
        a transconductance output configured to carry the differential output current.

4. The line driver of claim 1, where:
    the driving output comprises a differential output current.

5. The line driver of claim 3, where the transconductance stage further comprises:
    an amplifier configured to replicate a fraction of the differential voltage for generating the differential output current.

6. The line driver of claim 1, further comprising:
    differential input nodes operative to generate a specified output voltage at the differential output nodes.

7. The line driver of claim 6, where at least one of the differential input nodes is coupled to an amplifier input that is also coupled to at least one of the differential input nodes.

8. A method for driving a communication line, the method comprising:
    sensing a differential voltage on differential output nodes, in a transconductance stage coupled to the differential output nodes;
    generating, at a transconductance output of the transconductance stage, a differential output current corresponding to the differential voltage; and mirroring the differential output current to the differential output nodes.

9. The method of claim 8, further comprising:
providing a line driver voltage supply to differential output nodes; and
providing a transconductance stage voltage supply separate from the line driver voltage supply to the transconductance stage.

10. The method of claim 8, further comprising:
applying a differential input current to the transconductance stage to drive the differential output nodes.

11. The method of claim 8, further comprising:
applying a differential input current to an amplifier input in the transconductance stage that is coupled to a differential input node, to drive the differential output nodes.

12. The method of claim 8, further comprising:
applying a differential input current to a transistor in a current mirror stage to drive the differential output nodes.

13. The method of claim 8, further comprising:
replicating a fraction of the differential voltage in an amplifier stage configured to generate the differential output current from the fraction of the differential voltage.

14. The method of claim 8, further comprising:
actively terminating the differential output nodes with approximately 100 ohms of impedance.

15. A line driver comprising:
differential output nodes comprising a first output node and a second output node for coupling to a line driver voltage supply input;
a transconductance stage comprising:
a transconductance stage voltage supply input;
a first amplifier comprising:
a first input connected to the first output node;
a first output; and
a first output current path responsive to the first output and a first feedback resistor;
a second amplifier comprising:
a second input connected to the second output node;
a second output; and
a second output path current responsive to the second output and a second feedback resistor; and
a current mirror stage comprising:
a first current mirror operable to mirror current in the first output current path to the first output node; and
a second current mirror operable to mirror current in the second output current path to the second output node.

16. The line driver of claim 15, where the first current mirror comprises:
a diode-connected transistor in the first output current path; and
a mirror transistor connected to the diode-connected transistor and the first output node.

17. The line driver of claim 16, where the mirror transistor comprises a geometry with respect to the diode-connected transistor that implements a selected mirroring ratio.

18. The line driver of claim 17, where the transconductance stage further comprises:
a first voltage divider connected to the first output node and the first input.

19. The line driver of claim 15, further comprising:
differential input nodes operative to generate a specified output voltage at the differential output nodes.

20. The line driver of claim 19, where the differential input nodes comprise:
a first differential input coupled to the first input of the first amplifier; and
a second differential input coupled to the second input of the second amplifier.

\* \* \* \* \*